United States Patent [19]

Nagashima

[11] Patent Number: 4,715,845
[45] Date of Patent: Dec. 29, 1987

[54] SPROCKET WHEEL FOR DRIVING SAW CHAIN OF CHAIN SAW

[75] Inventor: Akira Nagashima, Kawasaki, Japan

[73] Assignee: Kioritz Corporation, Tokyo, Japan

[21] Appl. No.: 888,451

[22] Filed: Jul. 21, 1986

[30] Foreign Application Priority Data

Aug. 9, 1985 [JP] Japan ............ 60-122504[U]

[51] Int. Cl.⁴ .................................. F16H 55/30
[52] U.S. Cl. .................... 474/152; 474/157; 474/156; 30/381
[58] Field of Search ............ 474/152, 156, 157, 162, 474/163, 164, 165, 902; 74/439; 29/159 R; 30/381

[56] References Cited

U.S. PATENT DOCUMENTS

| | | | |
|---|---|---|---|
| 325,539 | 9/1885 | Herman | 474/164 |
| 388,317 | 8/1888 | Smith | 474/164 |
| 2,321,702 | 6/1943 | Renkin | 474/165 |
| 2,884,798 | 6/1959 | Wilson . | |
| 3,045,502 | 7/1962 | Carlton . | |
| 3,068,711 | 12/1962 | Even | 474/164 |
| 3,099,924 | 8/1963 | Armstrong . | |
| 3,144,890 | 9/1964 | Irgens . | |
| 3,491,806 | 1/1970 | Kaisser et al. . | |
| 3,498,346 | 3/1970 | Gasner . | |
| 3,519,037 | 7/1970 | Linkfield . | |
| 3,683,980 | 8/1972 | Gasner . | |
| 4,330,286 | 5/1982 | Nagano | 474/152 |

Primary Examiner—James A. Leppink
Assistant Examiner—William P. Neuder
Attorney, Agent, or Firm—Browdy and Neimark

[57] ABSTRACT

A sprocket wheel for driving a saw chain of a chain saw including a pair of annular sprocket wheel members of the same shape and configuration each formed on one side surface thereof with elevated surface portions of a number which is one-half the desired number of the teeth of the sprocket wheel produced as an end product by joining the sprocket wheel members together in such a manner that the one side surfaces thereof having the elevated surface portions face each other.

3 Claims, 2 Drawing Figures

SPROCKET WHEEL FOR DRIVING SAW CHAIN OF CHAIN SAW

BACKGROUND OF THE INVENTION

(1) Field of the Invention

This invention relates to a sprocket wheel for driving a saw chain of a chain saw.

(2) Description of the Prior Art

A sprocket wheel for driving a saw chain of a chain saw of the prior art has hitherto been produced by assembling a plurality of parts of different shapes manufactured separately by investment casting or by means of stamping. The sprocket wheel of the prior art produced as described hereinabove has suffered the disadvantages that it is high in cost and low in dimensional precision.

SUMMARY OF THE INVENTION

(1) Object of the Invention

This invention has been developed for the purpose of obviating the aforesaid disadvantages of the prior art. Accordingly, the invention has as its object the provision of a sprocket wheel for driving a saw chain of a chain saw which is low in production cost and high in dimensional precision.

(2) Statement of the Invention

The outstanding characteristic enabling the aforesaid object to be accomplished is that the sprocket wheel comprises two annular sprocket wheel members of the same shape and configuration each having on one side surface thereof elevated surface portions of a number which is one half the desired number of the teeth of the sprocket wheel, the sprocket wheel members being joined together in such a manner that the one side surface of one sprocket wheel member having the elevated surface portions faces the one side surface of the other sprocket wheel having the elevated surface portions.

In producing the sprocket wheel of the aforesaid construction according to the invention, the two sprocket wheel members of the same shape and configuration can be produced with a high degree of dimensional precision as by cold forging, thereby enabling the production cost to be reduced. The invention enables even the sprocket wheels of a small number of teeth to be produced readily by joining the two sprocket wheel members together so as to form the desired number of teeth by assembling the elevated surface portions together.

DESCRIPTION OF THE PREFERRED EMBODIMENT

One embodiment of the invention will now be described by referring to the accompanying drawings.

In the illustrated embodiment which is directed to a sprocket wheel having seven (7) teeth, two annular sprocket wheel members of the same shape and configuration are produced and joined together in a manner as subsequently to be described, to provide a sprocket wheel for driving a saw chain of a chain saw as an end product.

Figure 1:
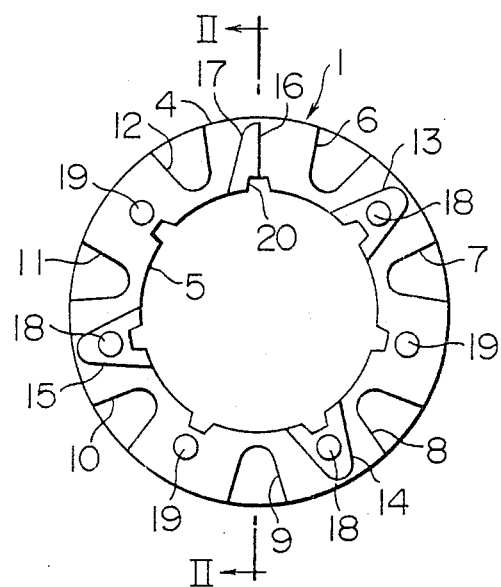
FIG. 1 is a plan view of the sprocket wheel member of the sprocket wheel for driving a saw chain of a chain saw which comprises one embodiment of the invention.
Figure 2:
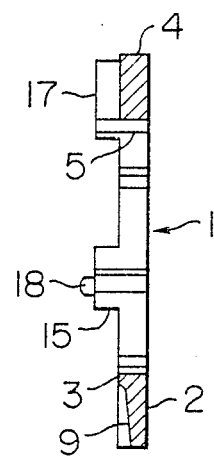
FIG. 2 is a sectional view taken along the line II—II in FIG. 1.

The two sprocket wheel members, one of which is generally designated by the reference numeral 1 in FIG. 1, are produced as by cold forging and have the same shape and configuration. The sprocket wheel member 1 has two side surfaces 2 and 3. One side surface 2 is substantially planar and constitutes one side surface of the sprocket wheel produced as an end product when the two sprocket wheel members 1 are joined together. The other side surface 3 is formed with seven (7) depressed surface portions 6, 7, 8, 9, 10, 11 and 12 for eliminating saw dusts each extending radially inwardly from an outer peripheral edge 4 of the annular sprocket wheel member 1 to the vicinity of an inner peripheral edge 5 thereof and spaced apart equidistantly from the adjacent depressed surface portions. Each depressed surface portion is shaped such that its width extending peripherally of the sprocket wheel member 1 and its depth extending axially thereof successively decrease in going from the outer peripheral edge 4 toward an inner end of its substantially semicircular portion. Elevated surface portions 13, 14 and 15 are also formed on the other side surface 3. The elevated surface portion 13 is located between the depressed surface portions 6 and 7 in a position which is diametrically opposed to the depressed surface portion 10. The elevated surface portion 14 is located between the depressed surface portions 8 and 9 in a position which is diametrically opposed to the depressed surface portion 12. The elevated surface portion 15 is located between the depressed surface portions 10 and 11 in a position which is diametrically opposed to the depressed surface portion 7. The elevated surface portions 13, 14 and 15 each extend radially outwardly from the inner peripheral edge 5 to the vicinity of the outer peripheral edge 4 and their width extending peripherally of the sprocket wheel member 1 successively decreases in going from the inner peripheral edge 5 toward an outer end of their substantially semicircular portion. A half-size elevated surface portion 17 which is similar in shape and size to one-half portion of the elevated surface portion 13 is located between the depressed surface portions 6 and 12 at one side of a radial line 16 extending along the center line of an area between the two depressed surface portions 6 and 12. The elevated surface portions 13, 14 and 15 are each formed with a projection 18.

Three recesses 19 are formed on the other side surface 3 for receiving the respective projections 18. One recess 19 is located between the depressed surface portions 7 and 8 in a position which is diametrically opposed to the depressed surface portion 11. Another recess 19 is located between the depressed surface portions 9 and 10 in a position which is diametrically opposed to the depressed surface portion 6. And still another recess 19 is located between the depressed surface portions 11 and 12 in a position which is diametrically opposed to the depressed surface portion 8. Located at the inner peripheral edge 5 and equidistantly spaced apart from each other are grooves 20 which extend axially for receiving a shaft.

The two sprocket wheel members 1 of the aforesaid construction which have the same shape and configuration are joined together in such a manner that the side surfaces 2 of the two members 1 contitute the two side surfaces of the sprocket wheel produced as an end product while the side surfaces 3 of the members 1 face each other. The projections 18 of one member 1 are fitted in the depressions 19 of the other member 1 and the half-size elevated portions 17 of the two members 1 are joined to each other back to back. This provides a sprocket wheel having seven (7) teeth spaced apart equidistantly from each other, when the two sprocket wheel members 1 are joined together by suitable means, such as welding, bonding or force fitting. The embodiment has been described as being directed to the production of a sprocket wheel having seven (7) teeth. However, the invention is not limited to this specific number of teeth and a sprocket wheel having any number of teeth can be produced by the invention. When a sprocket wheel of any desired number of teeth is to be produced, one only has to form on the sprocket wheel members in positions peripherally spaced apart from each other a plurality of depressed surface portions of a number which corresponds to the number of the teeth and a plurality of elevated surface portions of a number which is one half the required number of the teeth, regardless of whether the desired number of teeth is an even number or an odd number. When the desired number of teeth is an even number, the need to form a half-size elevated surface portion is eliminated.

What is claimed is:

1. A sprocket wheel for driving a saw chain of a chain saw comprising
   a pair of annular sprocket wheel members of the same shape and configuration each formed on one side surface thereof with elevated surface portions of a number which is one half the desired number of the teeth of the sprocket wheel produced as an end product by joining the sprocket wheel members together in such a manner that the one side surfaces thereof having the elevated surface portions face each other, wherein
   each said elevated surface portion provides a respective tooth of the sprocket wheel,
   said desire number of teeth is an odd number,
   each said pair of sprocket wheel members is formed with a plurality of projections on first respective parts of said one side surface thereof and with a plurlity of recesses on second respective parts of said one side surface thereof,
   said projections of each said sprocket wheel member are received in the respective recesses of the other when the two sprocket wheel members are joined together, and
   one of said elevated surface portions on each said sprocket wheel member is a half-size elevated surface portion, and the half-size elevated surface portions of the two sprocket wheel members are joined to each other back to back when the two sprocket wheel members are joined together to provide a completed respective one of said elevated surface portions.

2. A sprocket wheel according to claim 1, comprising
   each said first part of said one side surface of each said sprocket wheel member where a respective one of said projections is formed being on a respective full one of said elevated surface portions, and
   each said second part of said one side surface of each said sprocket wheel member where a respective one of said recesses is formed being located in a respective flat part of each said sprocket wheel member,
   wherein each said flat part adjoins a respective opposing one of said first parts of said sprocket wheel member when said pair thereof are joined to provide the sprocket wheel, the total number of said recesses and the total number of said full elevated surface portions on each said sprocket wheel member is $(n-1)/2$.

3. A sprocket wheel as claimed in claim 2, comprising at least one respective depression in each said one side surface of each said sprocket wheel member between each said full or half-size elevated surface portion.

* * * * *